(12) United States Patent
Shi et al.

(10) Patent No.: US 6,597,915 B2
(45) Date of Patent: Jul. 22, 2003

(54) SYSTEM AND METHOD FOR UPDATING LOCATION INFORMATION FOR DISTRIBUTED COMMUNICATION DEVICES

(75) Inventors: Qicai Shi, Coral Springs, FL (US); Edgar H. Callaway, Jr., Boca Raton, FL (US); Jian Huang, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 66 days.

(21) Appl. No.: 10/022,944

(22) Filed: Dec. 18, 2001

(65) Prior Publication Data

US 2003/0114168 A1 Jun. 19, 2003

(51) Int. Cl.$^7$ ................................................. H04Q 7/20
(52) U.S. Cl. .................... 455/456; 455/458; 455/67.1; 455/343; 455/573; 455/574; 340/825.49
(58) Field of Search ............................. 455/456, 458, 455/67.1, 343, 573, 574; 340/825.49

(56) References Cited

U.S. PATENT DOCUMENTS

| | | | | |
|---|---|---|---|---|
| 6,134,446 A | * | 10/2000 | Sasuta et al. ............... | 455/456 |
| 6,363,323 B1 | * | 3/2002 | Jones ........................... | 701/213 |
| 6,486,794 B1 | * | 11/2002 | Calistro et al. ......... | 340/825.49 |
| 6,522,265 B1 | * | 2/2003 | Hillman et al. ............. | 340/988 |
| 6,522,888 B1 | * | 2/2003 | Garceran et al. ........... | 455/456 |

* cited by examiner

Primary Examiner—Lee Nguyen
Assistant Examiner—Marceau Milord
(74) Attorney, Agent, or Firm—Andrew Fuller

(57) ABSTRACT

Location related information is collected for a network of communication devices that each is operable in a coordinating mode and in a non-coordinating mode. While in the coordinating mode, each communication device collects and stores location determining information (410, 420). Using the location determining information collected by one or more of the communication devices over multiple instances of operation in the coordinating mode, location information is calculated or updated for selected devices within the network (510, 520, 530, 540). In one embodiment, each device operates to mediate communication activities among others devices of the network while in the coordinating mode.

16 Claims, 3 Drawing Sheets

SYSTEM AND METHOD FOR UPDATING LOCATION INFORMATION FOR DISTRIBUTED COMMUNICATION DEVICES

TECHNICAL FIELD

This invention relates in general to communication networks, and more particularly to the determination of location information for communication devices within a network.

BACKGROUND

Asynchronous communication networks of low power communication devices are being designed for a variety of applications. Low power devices generally use a low communication duty cycle frame structure in order to minimize the amount of power used while not actively communicating with other network devices. However, the use of a low communication duty cycle frame structure often implies that device availability is reduced. In wireless communication networks, a fundamental challenge is maintaining high availability communications while using low power wireless communication devices.

In one particular application of an asynchronous communication network, geographically dispersed sensing devices are used for monitoring purposes. Generally, information on the location of such sensing devices is useful for facilitating routing, configuration, control, and data management within the network. When such devices are moved, the device location needs to be updated. However, for low-cost devices, the calculation of location information can be very complicated, particularly when there are a large number of devices. Ideally, location information is derived only when necessary, for instance, for those devices that have been moved.

Generally, there is a desire for networks of low power, low cost wireless devices with location awareness for each device. Existing network designs do not adequately provide for a low cost, reliable method for maintaining location information within such networks. Therefore, a new system and method for maintaining updated location information in a network of distributed communication devices is needed.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
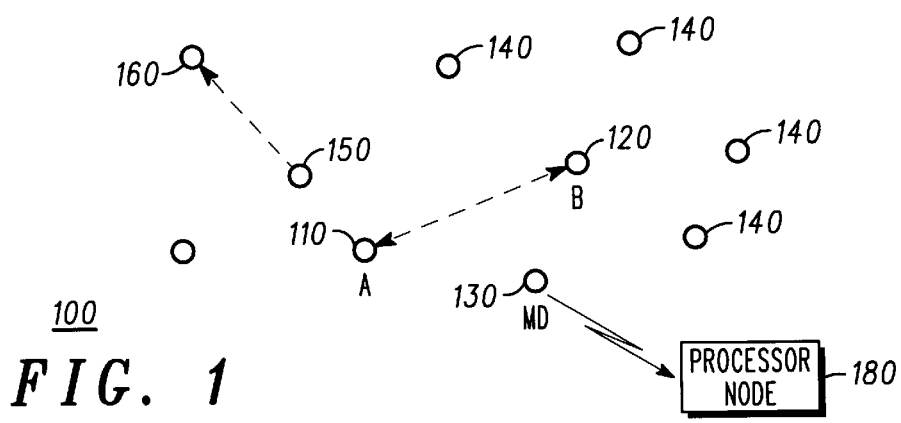
FIG. 1 is a network containing multiple low power devices and an additional low power device functioning as a mediation device, and a processor node to derive location information based on the measurements, in accordance with the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Generally, the present invention provides for a method of updating location information for communication devices organized in a spatially dispersed network, which method is particularly useful for asynchronous networks. At multiple instances over a period of time, each of several communication devices alternatively operates in three distinct modes, including a sleep mode, an ordinary or normal communication mode, and a management mode. In the normal communication mode, the communication device wakes up and performs a particular function, and in the management mode, the communication device communicates with others within the network to collect and store location-determining information. Location information for selected devices on the network is updated using the location determining information collected by one or more communication devices over multiple instances of operation in the management mode. In one embodiment, the communication device also manages communication activity for others while in the management mode.

For the purposes of illustrating the invention, the term Mediation Device (MD) is used herein to refer to a communication device operating in a management or mediation mode, which terms are used synonymously. In the management mode, the communication device operates to communicate with other networked devices and to collect and store information useful in the determination of location information. In the preferred embodiment, signal quality estimates are collected based on the communication signals transmitted by other devices. The signal quality estimates are used to determine the relative distances of neighboring networked devices.

In the preferred embodiment, the MD also acts as a mediator between communication devices within its communication range, and is capable of recording and playing back message related information. This is most useful when two communication devices are unable to establish contact. More than one MD may also be used in a multi-hop network, where each MD mediates for a group of low-power, low communication duty cycle communication devices that are within the communication range of the MD. The MD has a relatively high duty cycle as compared to the low-power communication devices in the group and is thus able to store and forward messages between two or more low power communication devices in the asynchronous network.

Each low power communication device may be operable as a MD within the asynchronous network, with a low power communication device of the network being randomly chosen to temporarily operate as a MD of the group. This allows the overall network to remain a low power, low cost asynchronous network and each low power wireless device to remain a low communication duty cycle device, except when serving as a MD. Since a low power wireless device is a MD only occasionally, the average communication duty cycle of each low power wireless device can remain low. Distributing MD functionality across all the communication devices in the network also allows the communication devices to use energy mining in order to increase the average communication duty cycle of the communication devices in the network.

During normal asynchronous network operation, each communication device has a low communication duty cycle frame structure. The communication duty cycle of the device may be adapted to the design parameters of the network, so that changing the parameters of the MD has an impact on the availability of each communication device within communication range of the MD.

According to the invention, FIG. 1 shows a network 100 containing several low power communication devices, in accordance with the present invention. Some of devices 110, 120, 130, 150, 160 are shown in an active communication mode, while other devices 140 are shown operating in a sleep mode. Each of the low power communication devices 110, 120, 130, 140, 150, 160 can function as MD. As shown, communication device 130 is temporarily functioning as a MD. Each low power communication device functions as MD in a random order. In the preferred embodiment, a processor node 180 functions as a computation device for calculating the relative or actual location of various devices within the network. The processor node 180 communicates with a device functioning as an MD device, such as device 130, to obtain location determining information, which is combined with similar information obtained from other devices operating as the MD to generate location information on the networked devices.

There are several approaches that may be used to select the next MD. In one approach, the MD could be selected at random when the low power communications device acting as MD is not able to act as MD any longer. If each MD uses a randomly generated initial phase offset tO, then the distribution of MD functionality across the low power communication devices within the network should be uniform. This selection process will prevent collisions between two low power communications devices attempting to concurrently act as MD, but it requires coordination amongst the low power communication devices within the network. A second approach, and the one used in the second preferred embodiment, is to let each low power wireless device randomly determine when it will act as MD. In the case of two low power communication devices acting as MD, a collision avoidance strategy will be used to ensure only one MD is within communication range of a low power communication device.

Figure 2:
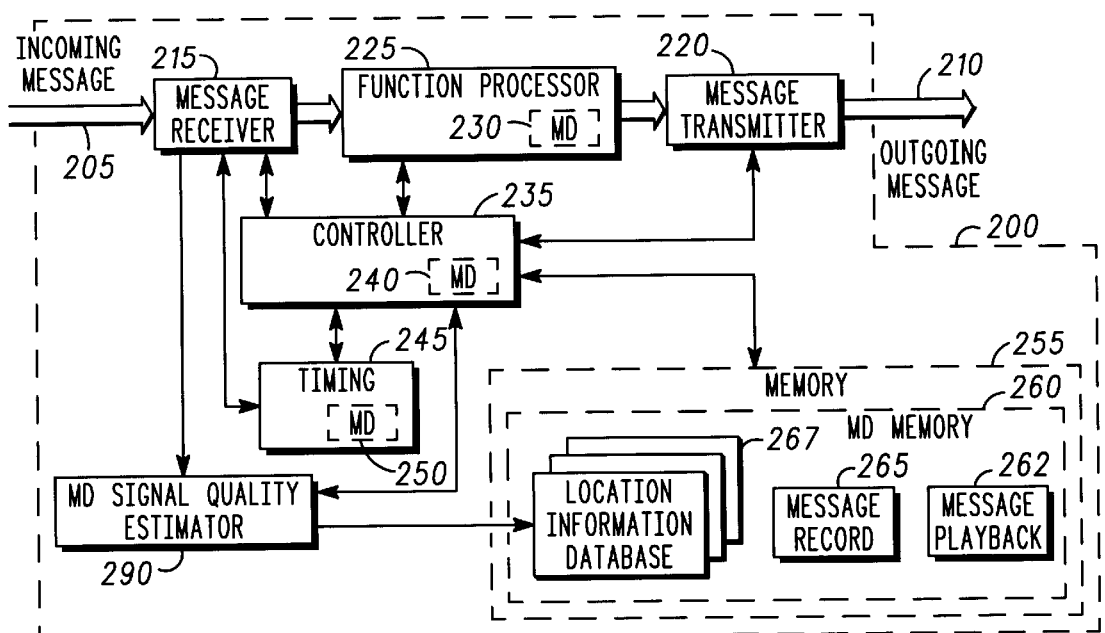
FIG. 2 is a block diagram showing functional blocks of a low power device operable as a mediation device, in accordance with the present invention.

Referring now to FIG. 2, a system level block diagram 200 of the internal operation of a low power communication device having MD functionality is shown according to the second embodiment of the invention. The device 200 as shown supports two distinct but compatible functionalities: location determining information collection and storage, and communication activity coordination. Both functions are preferably implemented in one device as part of an overall system configuration. However, the function related to location determining information collection and storage may be implemented apart from the function relating to communication activity coordination without departing from important aspects of the present invention.

In the device 200, a message receiver 215 receives incoming messages 205 and provides information to a function processor 225. The function processor 225 includes components particular to the overall function of the device, such as components for sensing, measuring, monitoring, control, and/or other functions. A message transmitter to 220 coupled to the function processor 225 provides the capability of transmitting data pertaining to device function or other communication and is needed. A timing module 245 provides information for communication, synchronization, and other device functions. A memory module 255 stores operating instructions and data for the device, and the controller 235 provides overall control for the device. The device 200 also includes components or functionality specifically for supporting MD activities. For example, the function processor 225, the controller 235, the timing module 245, and the memory module 255, all contain components 230, 240, 250, 260, specifically geared toward supporting the MD functionality. The memory component 260 contains a database 267 for storing location determining information. The memory 255 includes message record instructions 265, and message playback instructions 262 to allow the device 200 to function as a communication activity coordinator. Using the message record and playback instructions 265,262, the device, when operating as an MD, can mediate requests from communication devices within the network by recording messages, playing back messages, and saving communication device contact information. The database 267 further includes storage for multiple instances of location determining information. Preferably, the location determining information includes signal quality information, such as received signal strength information (RSSI) for communication signals received from particular devices or related derived information. A signal quality estimator 290 is coupled to the message receiver 215 and operates to analyze communication signals received by the device in order to determine signal characteristics, and to generate, for example, the RSSI. The RSSI is useful for estimating the relative distance between the device and another device with which it is communicating. Note that the signal quality information may comprise other data such as correlation and symbol synchronization values.

In general, the device 200 is capable of supporting specialized functionality for collecting and recording location determining information, and for sending and receiving several types of MD messages, including the source communication device identifier, the destination communication device identifier, the message, time of desired communication, message replay requests, control words, and device status messages. This specialized functionality is in addition to the normal operational mode representative of the plethora of low power communication devices in the network. One skilled in the art will recognize that the functional blocks illustrated in the system level block diagram 200 of FIG. 2 may be modified or combined without departing from the spirit and scope of a low power communication device that sends messages, receives messages, and processes messages. In particular, it should be noted that the MD functionality shown in FIG. 2 may be further combined or isolated from the non-MD operation of communication device 200, so long as the device 200 is operable as a MD on the network.

Figure 3:
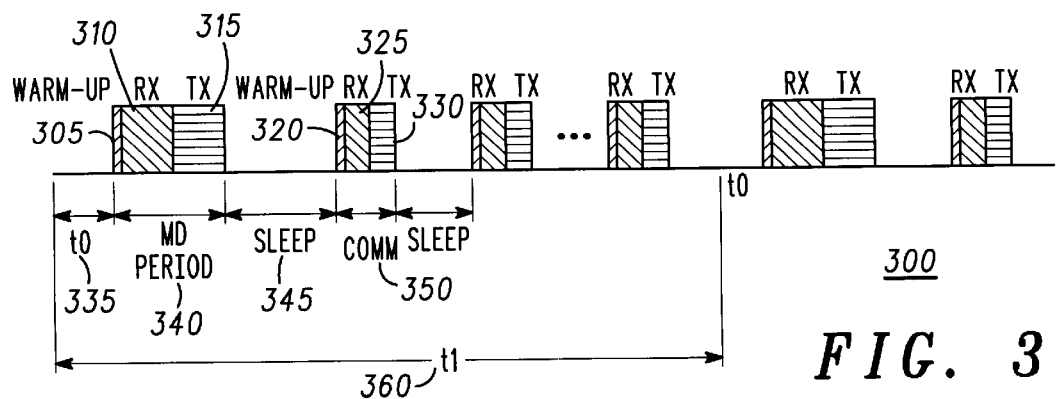
FIG. 3 illustrates a low communication duty cycle frame structure for a low power device, according to the second embodiment of the present invention.

Referring now to FIG. 3, a representative low communication duty cycle frame structure 300 of low power communication device 200 is shown. Low communication duty cycle frame structure 300 contains periodic super frame sequences 360. A super frame 360 contains a plethora of modes. A first mode of the plethora of modes of a super frame 360 is a random delay to block 335, the random delay has duration to 335, where to is between 0 and the duration of a single transmit or receive period. This delay randomizes the start time of each super frame of the communication devices in the network, so that the probability of multiple devices to function as MD concurrently is reduced. A MD mode 340 occurs next chronologically, which contains a warm-up block 305, a receive slot 310 and a transmission slot 315. Warm-up block 305 is a very small percentage of the overall MD mode. In the preferred embodiment, the one receive slot 310 precedes the one transmit slot 315, although the order could be switched. Also, one of ordinary skill in the art will recognize that MD block 340 could contain several transmit and receive slots in various arrangements. Also, although transmit slot 315 occurs directly before or directly after receive slot 310, the hardware contained in the transmitter and receiver will require some time to switch between transmit and receive modes. The duration of the switching time can be dependent on the switching speed of the hardware in the communication devices, or it could be determined by a user specified parameter in the communication device processor.

After MD mode 340 ends, a sleep mode 345 begins. In the preferred embodiment, the sleep block 345 is less than half of the overall MD 340 duration. After the sleep mode 345 ends, a regular communication mode 350 begins. A communication mode 350 further contains a warm-up block 320, a receive slot 325 and a transmission slot 330. A communication block 350 is a very small duration when comparing with the duration of a sleep mode 345. At the end of the communication block 350, the low power communication device 200 repeats the sleep mode 345 and the communication mode 350 until the end of the super frame 360.

At the conclusion of the first super frame, the entire framing sequence just described is repeated until low power communication device 200 stops functioning as a communication device. The decision to stop functioning as a communication device is made solely by the low power communication device 200 in the preferred embodiment, although it is also possible to coordinate the role of MD among several low power communication devices. Note that low power communication device 200 contains the ability to generate and store random or pseudo-random numbers. These numbers could be generated by MD processor 230, and stored in the MD memory 260.

According to the invention, each device in a network of communication devices, at multiple instances over a period of time, is alternatively operated in first, second, and third distinct modes. The operation of each device may be independent, in that the timing of the modes is not synchronized between devices, or the operation of two or more devices may be coordinated. In the first mode, the device sleeps for a particular period of time, and in the second mode the device wakes up and performs a particular function. In the third mode, the device communicates with others of the networked devices, and collects and stores location determining information. Using the location determining information collected by one or more of communication devices over multiple instances of operation in the third mode, location information is calculated or updated for selected devices within the network. In the preferred embodiment, the particular device is operable to mediate or manage communications among others devices of the network during a mediation communication period while in the third mode, such as by managing the timing schedule activity for others of the networked devices. Accordingly, the third mode is referred to herein as a mediation or management mode. On the other hand, the device is not operable to mediate communications for other communication devices while in the second mode, but is operable to perform a particular function such as monitoring, measuring, sensing, reporting, and the like. Each communication cycle preferably includes a mediation communication period corresponding to the mediation mode, and multiple normal communication periods interspersed with multiple sleep periods during the normal operating mode. Preferably, upon entering the mediation mode, each communication device randomly sets the duration of a first communication cycle of the communication device, and collects and stores location determining information based on communication with other communication devices.

Figure 4:
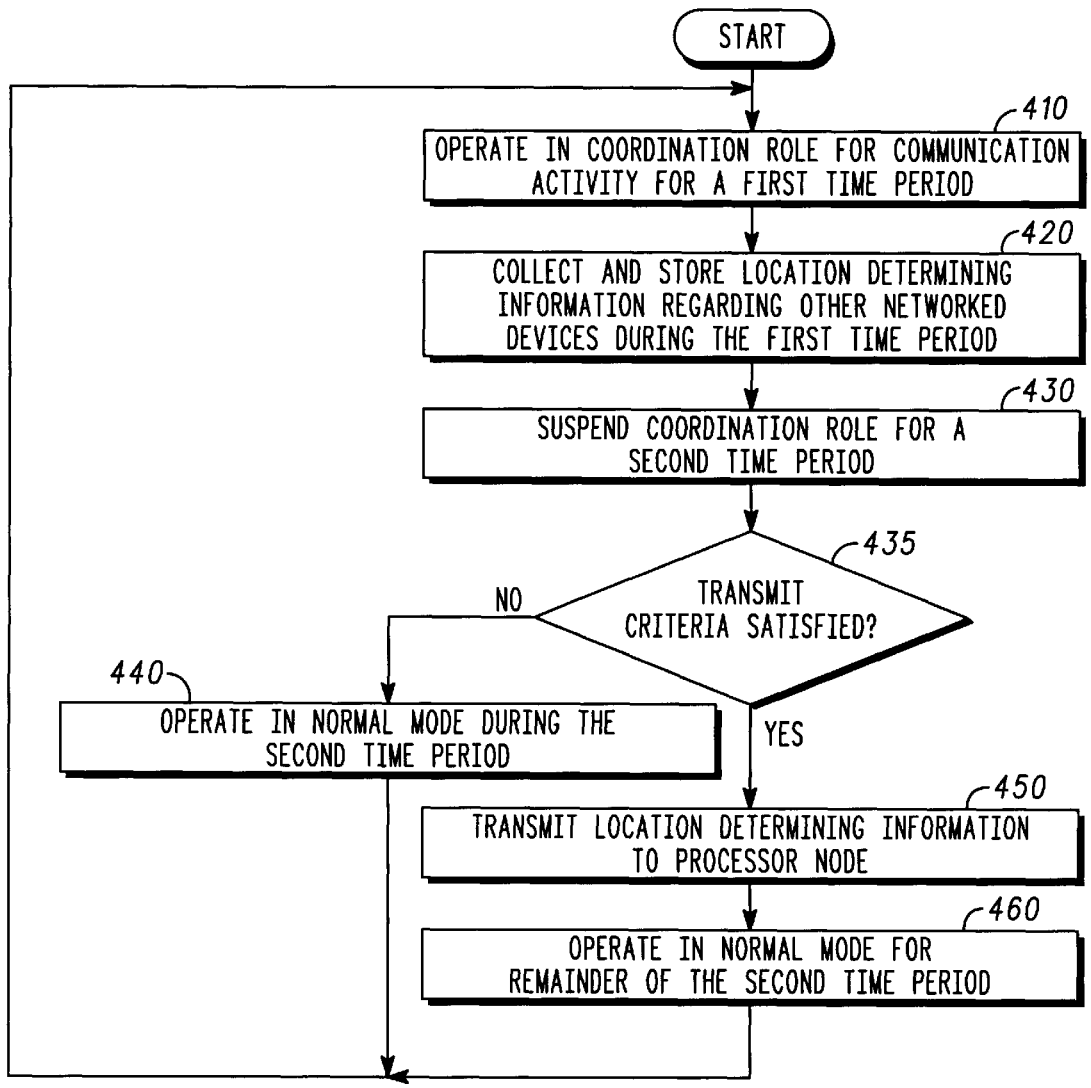
FIG. 4 is a flowchart of procedures for operating a communication device as a mediation device, in accordance with the present invention.

FIG. 4 is a flowchart of procedures used by a communication device functioning as an MD, in accordance with the present invention. At a particular instance of time, preferably randomly selected, and for a first time period, the device operates by performing a coordinating role for communication activity among other communication devices, step 410. Preferably, the communication devices of a network or subset group within a network cooperate such that only one device function as an MD device at any particular time. In this role, the device receives communication from other devices. Signal quality estimates are obtained and recorded for communication signals received from the other devices. In preferred embodiment, received signal strength information pertaining to each of communication received is analyzed, and pertinent information useful in determining relative location is recorded. For example, using known techniques, estimates for the relative distance between the MD device and another networked device can be estimated. In this manner, the device collects and stores location determining information regarding other communication devices, step 420. After termination of the first time period, and for the duration of a subsequent second time period, the coordinating role is suspended or relinquished, step 430. While in the second time period, the device determines if it should send location determining information to the processor node, by testing the value of a transmit criteria, step 435. The transmit criteria may be, for example, a simple timer, or a function of the location determining information itself. If the transmit criteria is not satisfied, the device functions in a normal operating mode, including periods of non-activity or sleeping, and periods of performing specific device functions such as monitoring, sensing, tracking, and the like, for the remainder of the second time period, step 440. Also, during the second time period, the device communicates with other communication devices within range that have the coordinating role. The device then resumes operation in a coordination role, step 410.

Figure 5:
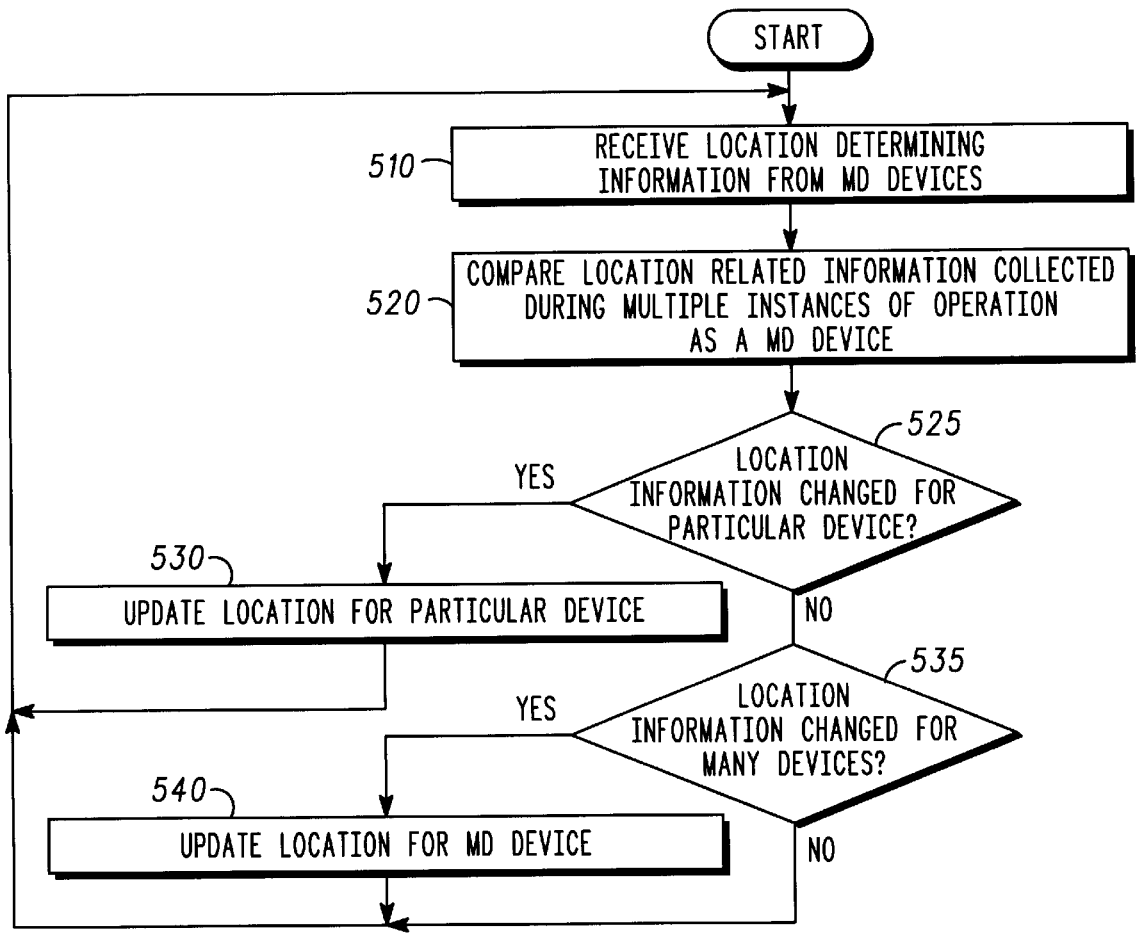
FIG. 5 is a flowchart of procedures for operating a processor node to compute location information for a network of devices, in accordance with the present invention.

If the transmit criteria are satisfied in step 435, the device uploads or transmits the collected location determining information to a processor node for computation of location information for the networked devices, step 450, then operates in a normal operating mode for the remainder of the second time period, step 460. The device then resumes operation in a coordination role, step 410. FIG. 5 is a flowchart of procedures used by a processor node, in accordance with the present invention. The processor node receives location determining information from various MD devices, step 510. The processor node compares location determining information such as received signal strength for communication signals received by an MD device from another device during the duration of multiple instances of operation as an MD, such as between the first and third time periods referred to in FIG. 4, step 520. In one instance, the processor node determines that a particular device has a change in location when the comparison shows that the received signal strength differs for communication signal received over at least two instances of operation as an MD, steps 525, 530. In another instance, the processor node detects that the MD device itself has changed location relative to others in the network when the comparison shows that the location determining information collected during a particular instance of operation as an MD, differs for a substantial number of devices when compared to that collected during one or more previous instances of operation as an MD, steps 535, 540. Those skilled in the art understand that averaging or other mathematical manipulation of the location determining information sent to the processor node may be performed to improve the reliability of the location change determination. Such manipulation may be performed at the MD device(s), at the processing node, or both. The location information for a particular device is updated in response to a detected change in location.

The present invention provides for significant advantages over the prior art. By employing a distributed information collection model, location information can be derived for asynchronously networked devices in an effective and efficient manner. The location information collection process can be combined with overall communication activity management or mediation to build a more powerful and flexible communication network, using low power, low complexity communication devices.

While the invention has been particularly shown and described with reference to a preferred embodiment, it will be understood by those skilled in the art that various changes in form and detail may be made therein without departing from the spirit and scope of the invention.

We claim:

1. A method of updating location information for communication devices that are spatially distributed, the method comprising the steps of:
    at each of a plurality of communication devices and at multiple instances over a period of time, alternatively operating in first, second, and third distinct modes, wherein the first mode comprises sleeping for a particular period of time, the second mode comprises waking up and performing a particular function, and the third mode comprises communicating with others of the plurality of communication devices and collecting and storing location determining information; and
    updating location information for selected devices of the plurality of communication devices device based on location determining information collected by at least one of the plurality of communication devices over multiple instances of operation in the third mode.

2. The method of claim 1, further comprising the steps of:
    detecting that a particular device of the plurality of communication devices has a change in location by comparing location determining information collected by at least one of the plurality of communication devices during multiple instances of operation in the third mode; and
    updating location information for the particular device in response to a detected change in location.

3. The method of claim 2, further comprising the step of uploading to a centralized processor, by selected devices of the plurality of communication devices, location determining information for communication devices having a change in location for determining relative location information for the plurality of communication devices.

4. The method of claim 1, further comprising the step of coordinating communication activity for others of the plurality of communication devices while operating in the third mode.

5. The method of claim 4, wherein the step of coordinating further comprises the step of managing timing schedule activity for others of the plurality of communication devices while operating in the third mode.

6. The method of claim 1, further comprising the step of operating the plurality of the communication devices such that only one of the plurality of communication devices function in the third mode at any particular time.

7. The method of claim 1, further comprising the step of in at least one of the plurality of communication devices, selecting a time to operate in the third mode via an independent, random process.

8. The method of claim 1, wherein the location determining information comprises signal quality information for communication signals received from another of the plurality of communication devices.

9. The method of claim 8, wherein the signal quality information comprises received signal strength information.

10. A method operating a plurality of communication devices, the method comprising the steps of:
    at a particular device randomly selected from the plurality of communication devices and at multiple instances over a period of time, alternatively operating in a coordinating mode for coordinating communication activity among the plurality of communication devices, and a non-coordinating mode, in which coordination for communication activity is provided by another of the plurality of the communication devices, and while operating in the coordinating mode, collecting and storing location determining information received from others of the plurality of communication devices;
    determining that one of the plurality of communication devices has changed location by comparing location determining information collected during different instances of operation in the coordinating mode; and
    updating location determining information for selected devices of the plurality of communication devices device based on location determining information collected by the particular device for at least two instances of operation in the coordinating mode.

11. The method of claim 10, further comprising the step of determining that the particular device has changed location relative to others of the plurality of communication devices when a comparison of relative location determining information collected during two different instances of operation in the coordinating mode yield differences for a substantial number of the plurality of communication devices.

12. The method of claim 10, wherein the relative location information comprises signal quality information for communications between the particular communication device and another of the plurality of communication devices.

13. A method operating a plurality of communication devices, the method comprising the steps of, at a particular device selected from the plurality of communication devices:
    operating in a coordinating role for communication activity for others of the plurality of communication devices during a first period of time;
    receiving a first communication from each of the other devices of the plurality of communication devices;
    recording signal quality information pertaining to each of the first communication received;
    operating in a role other than a coordinating role for a second period of time subsequent to the first period of time;

operating in a coordinating role for communication activity for others of the plurality of communication devices during a third period of time;

receiving a second communication from each of the other devices of the plurality of communication devices;

comparing the signal quality information for the second communication to that of the corresponding first communication for each of the second communication received;

determining that a particular device has a change in location when the signal quality information for the corresponding first communication is significantly different from that of the second communication; and transmitting location determining information for the particular device.

14. A method of operating a plurality of communication devices, the method comprising the steps of:

at a particular device selected from the plurality of communication devices:

performing a coordinating role for communication activity among the plurality of communication devices during a first time period;

collecting and storing location determining information regarding others of the plurality of communication devices during the first time period;

suspending the coordinating role for the duration of a second time period subsequent to the first time period;

communicating with the other communication device having the coordinating role during the second time period;

resuming the coordinating role during a third time period subsequent to the second time period;

collecting location determining information regarding others of the plurality of communication devices during the third time period;

comparing location determining information collected by the particular device during the first and third time periods;

detecting that the particular device has changed location relative to others of the plurality of communication devices when the location determining information collected during the third period for a substantial number of the plurality of communication devices is different from that collected during the first time period; and updating location information for the particular device in response to a detected change in location.

15. A method of operation of a plurality of communication devices of an asynchronous network, each of the plurality of communication devices being capable of operating in any one of a mediation communication mode for coordinating communication activity among others of the plurality of communication devices, a normal communication mode for non-coordinating communication activity, and a sleep mode for no communication activity, the method comprising the steps of:

randomly selecting the mediation communication mode for each of the plurality of communication devices;

at each of the plurality of communication devices, storing a compilation of location determining information based on communication received during each instance of operation in the mediation communication mode;

detecting changes in relative location among the plurality of the communication devices by examining changes in location determining information collected by each of the plurality of communication devices during instance of operation in the mediation communication mode; and updating relative location information for at least some of the plurality of communication devices based on detected changes.

16. An asynchronous communications network, comprising:

a plurality of communications devices each having a plurality of communication cycles and each operable to mediate communications between the plurality of communication devices during a mediation communication period in a mediation mode and each not operable to mediate communications between the plurality of communication devices in a normal operating mode, wherein each communication cycle of the plurality of communication cycles comprises a mediation communication period during the mediation mode and a plurality of normal communication periods and a plurality of sleep periods during the normal operating mode, wherein upon entering the mediation mode, each communication device of the plurality of communication devices randomly sets a duration of a first communication cycle of the plurality of communication cycles of the communication device and collects and stores location determining information based on communication with others of the plurality of communication devices;

a processor node that receives the location determining information from the each of the plurality of communication devices and updates relative location information for the plurality of communication devices.

* * * * *